United States Patent
Jones

(10) Patent No.: US 6,825,432 B2
(45) Date of Patent: Nov. 30, 2004

(54) APPARATUS AND METHOD FOR FORMING A BODY

(75) Inventor: Steven A Jones, Derby (GB)

(73) Assignee: Rolls-Royce PLC, London (GB)

( * ) Notice: Subject to any disclaimer, the term of this patent is extended or adjusted under 35 U.S.C. 154(b) by 200 days.

(21) Appl. No.: 10/095,525

(22) Filed: Mar. 13, 2002

(65) Prior Publication Data

US 2002/0139779 A1 Oct. 3, 2002

(30) Foreign Application Priority Data

Mar. 27, 2001 (GB) .............................................. 0107559

(51) Int. Cl.[7] .......................... B23K 9/04; B23K 37/04
(52) U.S. Cl. ................................ 219/76.14; 219/137.61
(58) Field of Search ........................ 219/137.31, 137.8, 219/137.61, 76.14

(56) References Cited

U.S. PATENT DOCUMENTS

| | | | | |
|---|---|---|---|---|
| 4,621,762 A | * | 11/1986 | Bronowski | 228/215 |
| 4,671,448 A | * | 6/1987 | Million et al. | 228/119 |
| 4,837,417 A | | 6/1989 | Funk | |
| 4,893,388 A | * | 1/1990 | Amos et al. | 29/889.1 |
| RE35,756 E | * | 3/1998 | Schneebeli et al. | 219/76.14 |
| 6,274,839 B1 | * | 8/2001 | Stone et al. | 219/76.12 |

FOREIGN PATENT DOCUMENTS

| | | |
|---|---|---|
| EP | 0 070 689 A1 | 1/1983 |
| FR | 2 324 405 A | 4/1977 |
| WO | WO 97/18921 | 5/1997 |

* cited by examiner

Primary Examiner—M. Alexandra Elve
Assistant Examiner—Kevin McHenry
(74) Attorney, Agent, or Firm—Oliff & Berridge, PLC

(57) ABSTRACT

A method of forming a body by deposition of a weld material comprises providing a welding head (12), providing a foundation (52) upon which the body is to be formed. A weld material is supplied from a supply (22). The welding head (12) and the foundation (52) are connected to a supply of electricity to form an arc between the welding head (12) and the foundation (52) to melt the material. A raised member (74) is provided on the foundation (52). The method further includes manipulating the foundation (52) and the welding head (12) relative to each other to deposit the material on the raised member (74) and form the body.

5 Claims, 2 Drawing Sheets

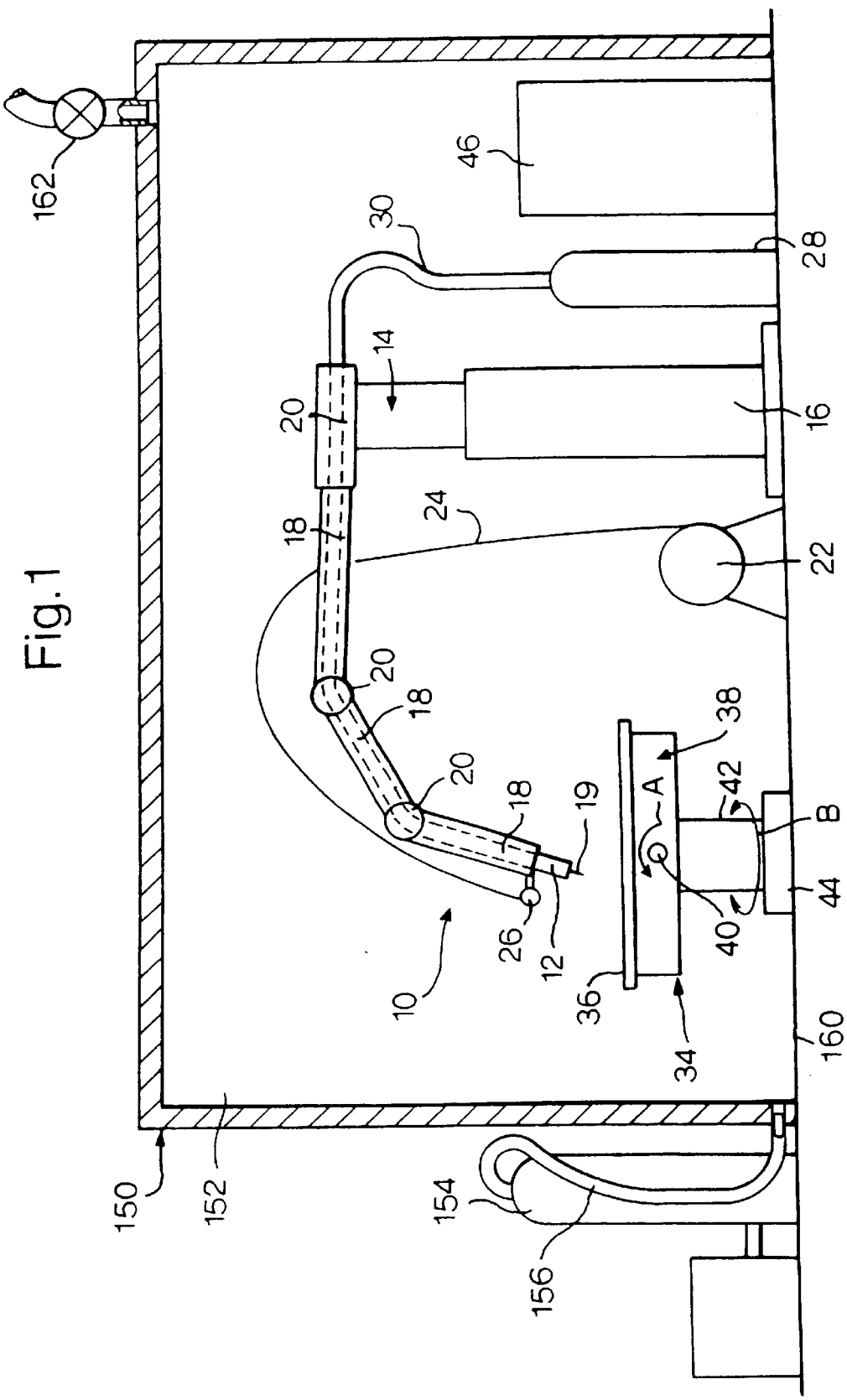

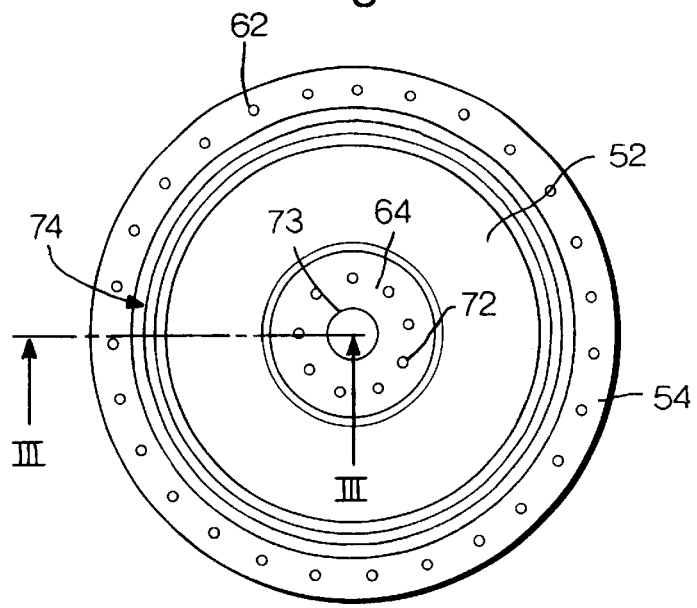
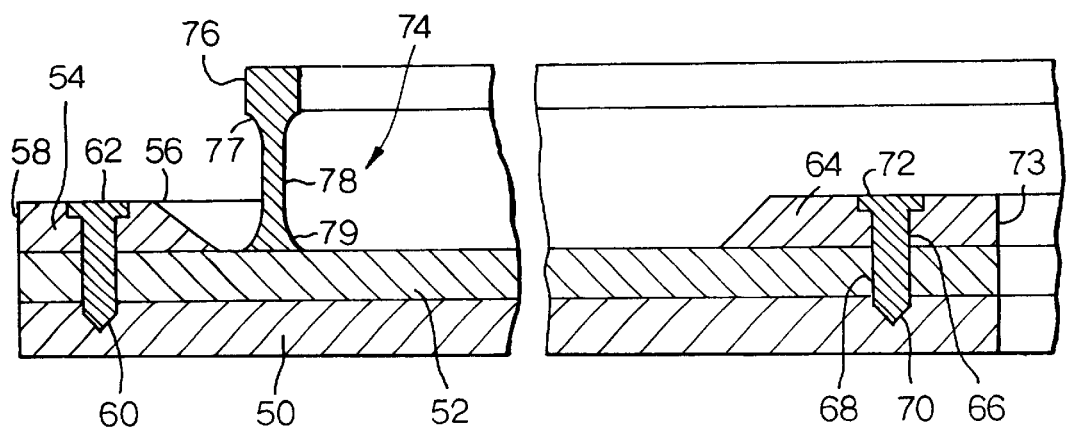

APPARATUS AND METHOD FOR FORMING A BODY

This invention relates to apparatus and methods for forming bodies. More particularly, the invention concerns apparatus and methods for forming bodies by deposition of a weld material.

The formation of components for aerospace engines can be carried out by any of several techniques of deposition of a weld material. These techniques involve the striking of an arc between two electrodes, the first electrode being held in a welding head to which is fed a supply of a weld material, the supply being in the form of a wire of the material wound upon a reel. The second electrode is in the form of a substrate or foundation upon which the weld material is to be deposited to form the component. The foundation may be in the form of a metal plate. A supply of an inert gas is fed to the welding head during its operation.

When the welding head and the foundation are connected to a supply of electricity, an arc is formed in the inert gas which melts the metal wire and the substrate. The metal is then deposited onto the foundation in a controlled manner. The welding head is mounted on a robotic arm and the plate is mounted on a movable turntable. By controlling the movement of the arm and the turntable, the metal can be deposited on the plate in order to form components of any desired shape.

One such method of forming components involves providing the welding head with a permanent electrode and also providing a separate metal wire to the welding head. This method is generally known in the art of tungsten inert gas welding which is generally shortened to TIG welding. The use of the word tungsten is intended as a synecdoche, and it will be appreciated by those skilled in the art that other suitable materials could be used as the electrode.

Another such method involves the use of a sacrificial electrode in the welding head. With this arrangement, the metal wire which provides the weld material also constitutes the electrode and is fed through the welding head. This method is generally known in the art as metal inert gas welding, which is generally shortened to MIG welding.

A problem with such techniques is that stresses can build up in the component, so that the component distorts when it is released from the plate.

According to one aspect of this invention there is provided a method of forming a body by deposition of a weld material, the method comprising providing a welding head and a support member upon which the body is to be formed, supplying a weld material to be deposited on the support member and connecting the support member and the welding head to a supply of electricity to form an arc between the welding head and the support member or the body to melt the material, wherein a raised member is provided on the support member, the support member and the welding head are manipulated relative to each other to deposit the material on the raised member and form said body thereon, wherein the raised member is configured to inhibit the conduction of heat from the body during formation of the body.

The method may further include a step of manipulating the welding head and the support member relative to each other to deposit a weld material on the support member to form the raised member before the step of forming the body on the raised member.

According to another aspect of this invention there is provided apparatus for forming a body by deposition of a weld material, the apparatus comprising a welding head, a support member on which the body is to be formed, and means for supplying a weld material, wherein the support member includes a raised member upon which the body can be formed.

The support member may be supported on support means which may comprise a turntable movable to a desired position.

According to another aspect of this invention, there is provided a support arrangement for use in forming a body by deposition of a weld material comprising a support member, and a raised member on the support member, on which the body can be formed.

Preferably, the raised member is configured to inhibit the conduction of heat from the body during formation of the body. The raised member may comprise a first section upon which the body is formed, and a second section extending from the first section to the support member, the second section being of a narrower cross-section than the first section. Preferably, the first section tapers inwardly to the second section. The second section may taper outwardly to the support member.

The weld material may be a titanium alloy, for example titanium 6/4, which includes 6% aluminium and 4% vanadium, or the weld material may be any other suitable alloy.

In one embodiment, the raised member is in the form of a wall which may extend around the foundation and which is preferably annular.

An embodiment of the invention will now be described by way of example only with reference to the accompanying drawings, in which:

FIG. 1 is a diagrammatic side view of apparatus for forming a body;

FIG. 2 is a top plan view of a support arrangement for use with the apparatus shown in FIG. 1; and FIG. 3 is a view along the lines III—III in FIG. 2.

Referring to FIG. 1, there is shown apparatus 10 for forming a body by deposition of a weld material. The apparatus 10 comprises an arc welding head 12, mounted on the free end of a support mechanism in the form of a robot arm 14. The robot arm 14 comprises a base member 16 on which is pivotally mounted a plurality of sections 18 which are movable about a plurality of axes 20 so that the welding head 12 can be manipulated to any desired position. The welding head 12 includes a first electrode 19.

A supply 22 of a metal wire 24 is provided, in the form of a reel around which the wire 24 is wound. The metal is in the form of a titanium alloy, for example titanium 6/4 which includes 6% aluminium and 4% vanadium. The wire 24 is fed from the reel 22 to the welding head 12 such that the end of the wire 24 is arranged just below the tip of the welding head 12. The wire 24 is held in place by suitable holding means 26.

The apparatus 10 also includes a supply of an inert gas, in the form of a cylinder 28, having a pipe 30 leading from the cylinder 28 to the welding head 12 through a pipe extending adjacent the robot arm 14. The gas is any suitable inert gas or gases, or combinations of inert and active gases, for example argon or argon/carbon dioxide and provides the medium in which an arc is formed, as will be explained below.

Support means 34 is provided beneath the welding head 12 and comprises a turntable 36 mounted upon a platform 38. The platform 38 is pivotally mounted, as indicated by the arrow A, by pivot 40 to a pedestal 42 which, in turn, is rotatably mounted, as indicated by the arrow B, upon a base member 44.

A support arrangement (not shown in FIG. 1) is mounted onto the turntable 36. The support arrangement includes a support member upon which the material of the wire 24 is deposited to form the body. In the preferred embodiment, the support member is in the form of a foundation plate 52 (see FIG. 3) upon which the body is to be formed. The foundation plate 52 constitutes a second electrode, with the arc being created between the first electrode in the welding head, and the second electrode which is in the form of a foundation plate 52.

Control means in the form of a computer 46 controls the movement of the support means 34 and the robot arm 14, as well as controlling the supply of argon, and the supply 22 of the metal wire 24.

An enclosure 150 defining a chamber 152 surrounds the arm 14 and the support means 34, thereby also surrounding the support arrangement 48 and the body formed thereon. In the embodiment shown, the cylinder 28 of the inert gas and the computer 46 are contained within the enclosure 150. The enclosure 150 can be formed by a suitable rigid material, for example aluminium or a plastics material. The enclosure may also comprise windows to view the body being formed therein and at a door to allow access inside the enclosure 150.

A second supply of an inert gas in the form of a second cylinder 154 is provided to supply the inert gas, for example argon, to the chamber 152 via a pipe 156 so that the atmosphere within the chamber 152 is substantially devoid of oxygen, or at least having less than 40 ppm oxygen therein, and is substantially devoid of nitrogen, or at least having less than 140 ppm nitrogen therein. In the embodiment shown in FIG. 1, the argon is fed to the chamber 152 just above the floor 160.

The argon is supplied at a rate of 300–400 liters/min. This rate of supply of argon is required to create turbulence and thereby dislodge any trapped pockets of air in the chamber 150.

The air, and the argon fed to the chamber 152 are evacuated therefrom via one or more valves 162 arranged on the top of the enclosure.

Referring to FIG. 2, there is shown a support arrangement for mounting on the turntable 36. The support arrangement is circular in plan view and comprises a steel base plate 50 upon which is mounted a foundation plate 52 which is of the same size and shape as the base plate 50. The foundation plate 52 is formed of a material which is compliant with the material of the wire 24, i.e. it is formed of a material which has similar metallurgical properties to the material of the wire 24. For example, in the present embodiment the foundation plate 52 is formed of a titanium alloy.

An outer annular securing member 54 is mounted on top of the foundation plate 52 and is provided with a plurality of apertures 56 which correspond with threaded apertures 58 in the foundation plate 52 and threaded bores 60 in the base plate 50. A plurality of screws or bolts 62 are received through the apertures 56 and threadably secured in the apertures 58 and the bores 60 to secure the annular member 54 on the foundation plate 52 thereby securing the foundation plate 52 in place.

A central annular securing member 64 is also arranged on top of the foundation plate 52 and defines a plurality of apertures 66 which correspond with threaded apertures 68 in the foundation plate, and threaded bores 70 in the base plate 50. A plurality of screws 72 are received in the aperture 66 to secure the central annular member 64 onto the foundation plate 52 thereby securing the foundation plate 52 in place.

The support arrangement is secured to the turntable 36 by suitable known securing means which passes through a central aperture 73 extending wholly through the support arrangement.

An annular wall 74 is then formed on the foundation plate 52 by the deposition method described above. This is carried out by rotating the turntable 36 and moving the welding head 12 relative to the foundation plate 52 such that the wall 74 is built up by the formation of continuous annular layers of the weld material.

Referring to FIG. 3, the wall 74 comprises a first section 76 upon which the body is formed. The first section 76 tapers inwardly at a lower region 77 thereof to a second section 78. The second section 78 extends downwardly from the first section 76 and is of a narrower cross-sectional width than the first section 76. A lower region 79 of the section 78 tapers outwardly to the foundation plate 52.

Thus, the wall 74 has a generally hour glass cross-sectional configuration, and the narrower second section 78 acts as a restriction to the conduction of heat from the first section 76. This has the advantage that, when the body is deposited onto the first section 76 by the method described above, some heat is absorbed by the first section 76. By restricting the conduction of heat away from the first section 76, heat is retained in the body and, as a result, the amount of strain induced into the body so formed is reduced. Thus, there is less likelihood of the finished body deforming when it is released, by being cut free, from the wall 74.

In operation, the turntable 36, and the welding head 12 are both connected to a supply of electricity, and argon is fed via the pipe 30 from the cylinder 28 to welding head 12 to form an argon shroud around the electrode of the welding head 12, and which extends to the foundation plate 52 or the part of the body being worked upon. The argon gas is ionised to form a plasma and an arc is created between the first electrode 19 in the welding head 12 and the foundation plate 52. The arc produces a high temperature, which is sufficient to melt the material of the foundation plate 52 in the vicinity of the arc and to melt the end of the wire 24 which is also in the vicinity of the arc. This melted material from the wire 24 and the foundation plate 52 forms a molten weldpool.

The position of the welding head 12 relative to the turntable 36 is controlled by the computer 46 by manipulating both the position of the welding head 12, and the position of the turntable 36. The computer 46 also controls the rate of feeding of the wire 24. Thus, by appropriate manipulation of the welding head 12 relative to the turntable 36, a component, for example for use in a gas turbine engine can be built up layer by layer by the deposition of the weld material from the wire 24. As will be appreciated when the body is partially formed, the welding head 12 deposits material on the body rather than the foundation plate 52. Consequently, the shroud extends from the welding head 12 to the part of the body being formed and the arc is created between the welding head 12 and the body.

The formation of the wall 74 is effected by the deposition method as described above. The different widths at different parts of the wall 74 can be formed either by varying the speed of rotation of the table, or by varying the arc energy, or both.

In order to form the wall 74, the table is continuously rotated, and the arc energy selected to deposit on the foundation plate 52 weld material suitable for forming the tapered region 79. By slowly increasing the speed of rotation of the table, or reducing the arc energy, the amount of weld material deposited is reduced such that the deposit tapers inwardly to the second section 78. The conditions of deposition are then maintained constant to build-up the second section 78.

At the top of the second section 78, the conditions are again varied to increase the amount of weld material deposited. Again, this variation is gradual so that the tapered region of the lower section 77 is formed. This is effected either by decreasing the speed of rotation of the turntable 36, or by increasing the arc energy, or both. When the tapered lower region 77 is completed, the conditions are maintained until the first section 76 is fully deposited.

There is thus provided a raised portion on a foundation for use in shaped metal deposition which will restrict the conduction of heat from the body being formed thereon thereby reducing the strain in the body and preventing distortion as the body is released from the wall.

Various modifications can be made without departing from the scope of the invention. For example while the above described embodiment uses tungsten inert gas (TIG) welding in which the metal wire 24 is separate from the electrode 19, the method and apparatus could also be used with metal inert gas (MIG) welding process in which the wire 24 is fed through the centre of the welding head 12 and constitutes the first electrode 19 which is consumed during the deposition process.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A method of forming a body by deposition of a weld material, the method comprising:

providing a welding head and a support member upon which the body is to be formed; and supplying a weld material to be deposited on the support member and connecting the support member and the welding head to a supply of electricity to form an arc between the welding head and the support member or the body to melt the material, wherein a raised member is provided on the support member, the support member and the welding head are manipulated relative to each other to deposit the material on the raised member and form said body thereon, the raised member includes a first section and a second section, the second section being of narrower cross-section than the first section, the second section extending from the first section to the support member, the body being formed on the first section and the narrower cross-section of the second section inhibits the conduction of heat from the body during formation, the formed body being subsequently released from the raised member.

2. A method according to claim 1 further including the step of manipulating the welding head and the support member relative to each other to deposit the weld material on the support member to form the raised member before the step of forming the body on the raised member.

3. A method according to claim 1 wherein the first section tapers inwardly to the second section and the second section tapers outwardly to the support member.

4. A method according to claim 1 wherein the raised member is in the form of a wall extending around the support member.

5. A method according to claim 1 wherein the raised member is in the form of an annular wall.

* * * * *